Dec. 16, 1941.  R. W. SHAFOR  2,266,386
INDUSTRIAL WASTE TREATMENT
Filed July 9, 1940  3 Sheets-Sheet 1
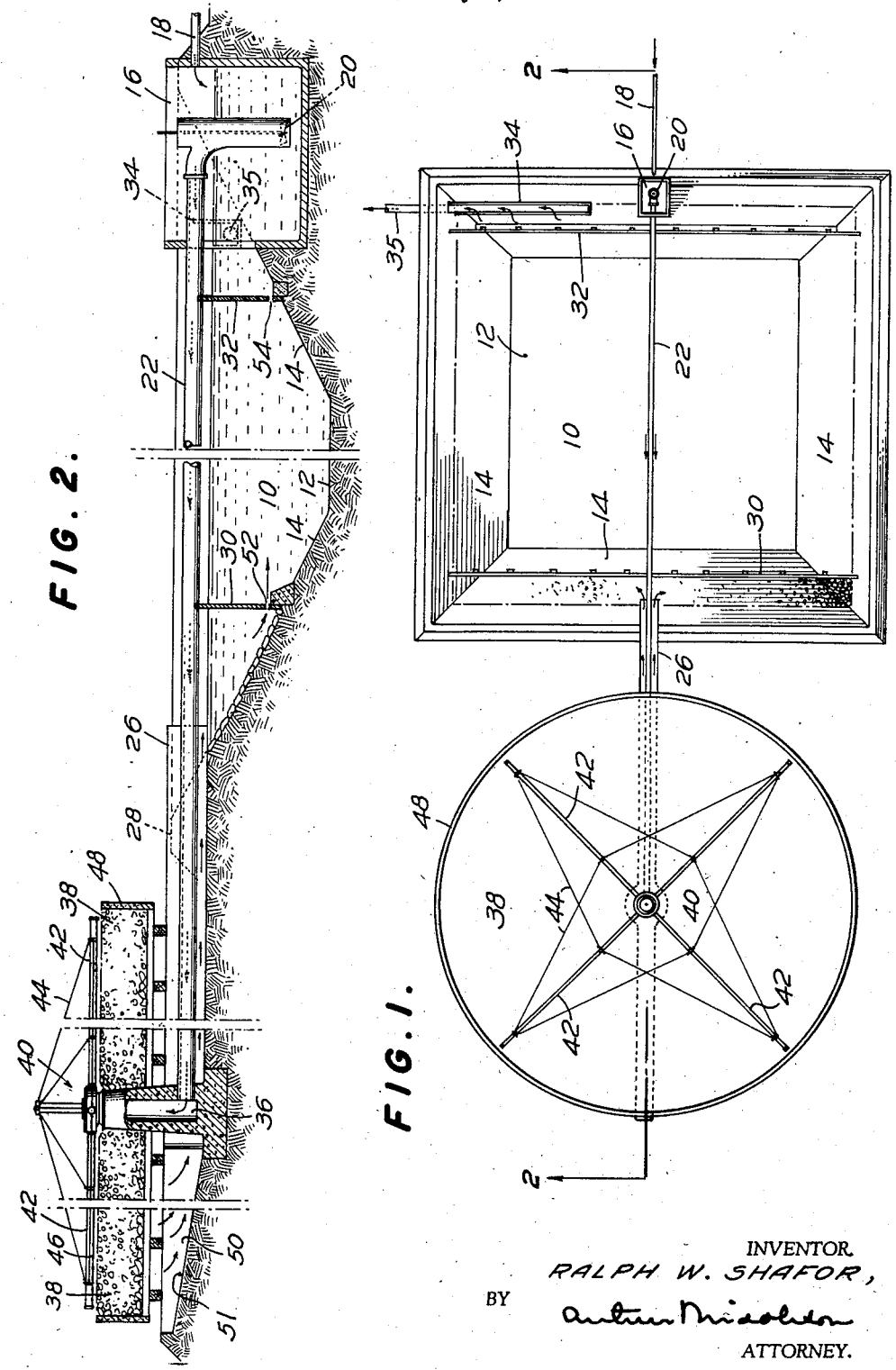
INVENTOR.
RALPH W. SHAFOR,
BY
ATTORNEY.

INVENTOR
RALPH W. SHAFOR,
BY
ATTORNEY.

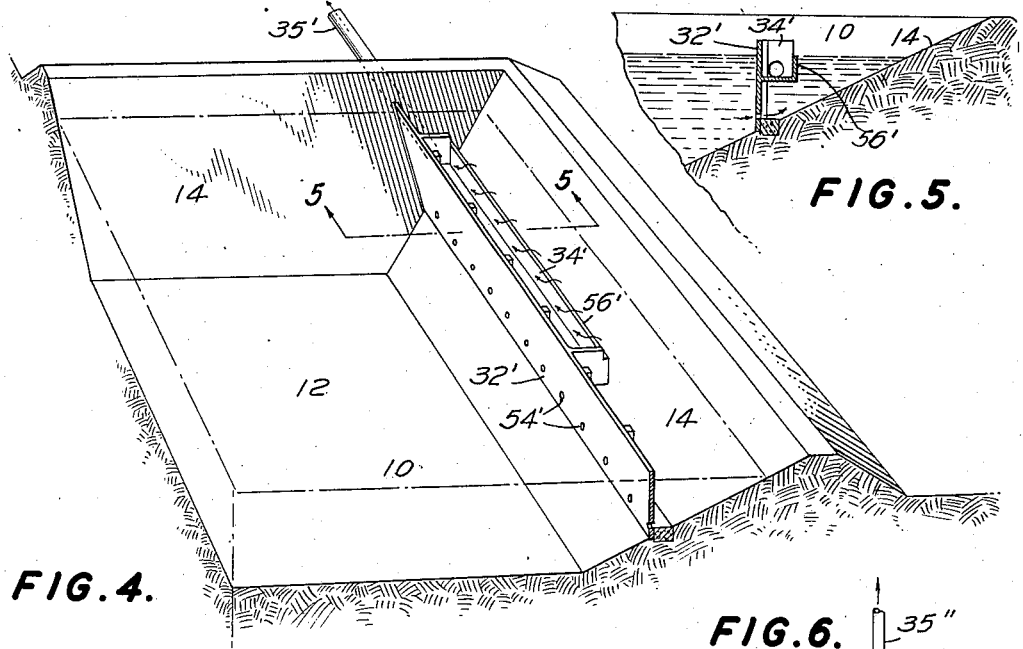
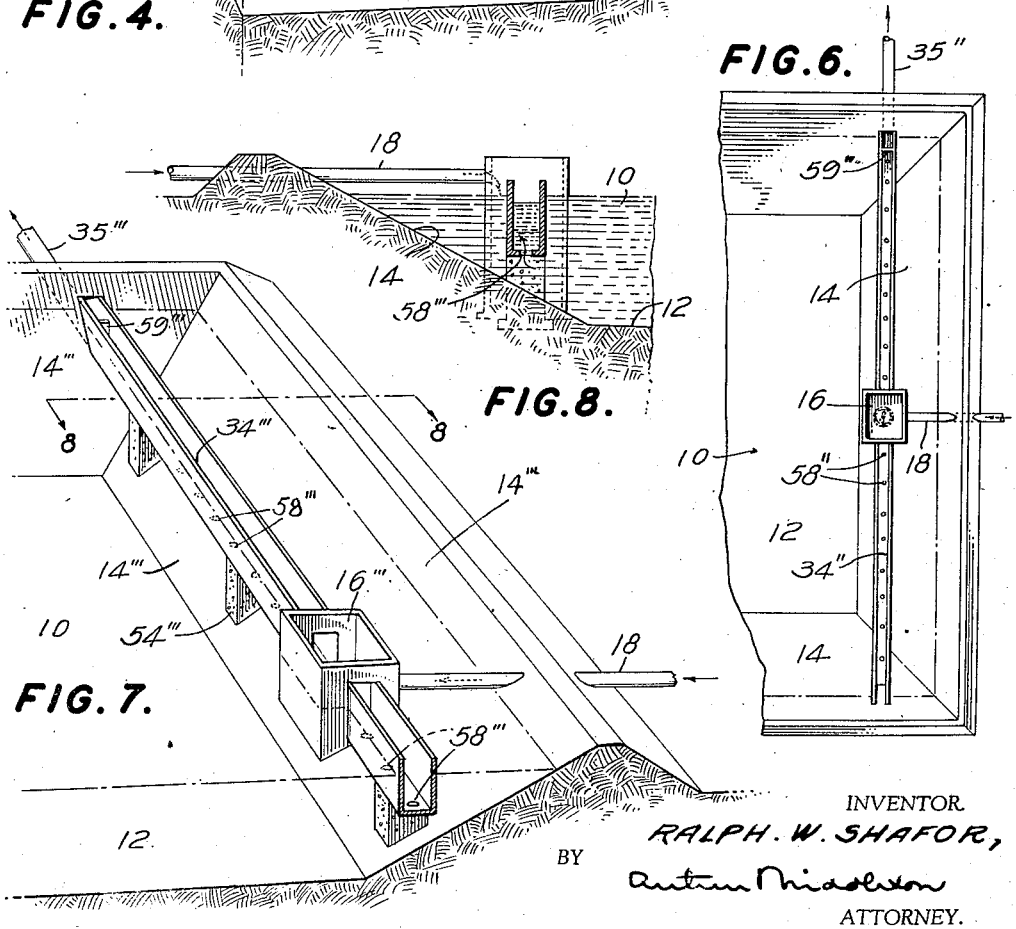

Patented Dec. 16, 1941

2,266,386

UNITED STATES PATENT OFFICE 2,266,386

INDUSTRIAL WASTE TREATMENT

Ralph W. Shafor, New York, N. Y., assignor to The Dorr Company, Inc., New York, N. Y., a corporation of Delaware Application July 9, 1940, Serial No. 344,584

6 Claims. (Cl. 210—7)

The present invention relates to a method and an apparatus for treating industrial wastes whereby waste from industrial and other establishments may be disposed of in an efficient manner at a relatively low cost and without contamination of streams.

The invention is particularly applicable to the disposal of clarified waste liquids, such as pre-clarified Steffen waste water arising in connection with the processing of sugar beets and beet sugar by-products. However, the principles of the invention are applicable to other uses and the same may, with or without modification, be employed in the treatment and disposal of a large variety of pre-clarified industrial wastes such as brewery waste, wastes arising in connection with canning operations, municipal sewerage wastes, etc.

Heretofore in sugar beet refinery practice, as well as in cannery and brewery operations, it has been customary to discharge the waste from the sugar beet processing or other operations directly into a stream without treatment. Where this condition has not been permitted by health authorities, the waste material has been subjected to various forms of primary sedimentation in an effort to reduce the amount of suspended solid matter delivered to the receiving stream. By such primary settling treatment for the removal of settleable solids, the "organic strength" of the liquid is often reduced by as much as twenty-five per cent. However, even after such primary treatment of the waste material, the clarified effluent from the primary settling tank is possessed of a certain amount of solids of an organic character which ferment quite freely and, under the laws of many states, even this clarified waste material may not be discharged into sewers or streams and the disposition of it has presented a serious economic problem. Several methods have been devised to contend with waste water of this character and among these are chemical precipitation and settling, the use of multi-effect evaporators, and stabilization of the liquid by biochemical oxidation.

Chemical precipitation has been used from time to time in connection with sedimentation but, because of the high cost due to the large quantities of chemicals employed, and due to the large volume of sludge produced which must ultimately be disposed of, this method has not proven commercially practicable.

Likewise, the use of evaporators represents a very heavy initial investment together with considerable maintenance and operating expenses.

On the other hand, stabilization of the liquid by natural biologic processes, while still presenting numerous operating problems and difficulties, is inherently advantageous in that the bacterial and plant life inhabiting the waste material is permitted to act upon the latter in such a manner as to change the form of the dissolved solids and of a certain portion of any suspended or bio-flocculated or precipitated solids, from an objectionable organic substance to a more suitable form wherein the liquid is free from any polluting influence so that it is in proper condition for discharge into the sewer or stream.

The present invention therefore relates specifically to such secondary treatment of pre-clarified waste waters arising from industrial processes.

As a means for subjecting pre-clarified waste material from beet sugar refining operations to secondary treatment as set forth above, trickling filters of the type sometimes employed in the treatment of only partially clarified sewage have been considered as a possible solution for attaining the desired end. Generally, a trickling filter consists of a bed of coarse discrete material such as gravel, crushed rock and the like, together with a means for applying the liquid uniformly over the upper area of the filter bed. Such a distributing means may take the form of rotary or traveling spray or distributor devices of various well-known types. The filter per se also includes an arrangement whereby the applied material is collected at the bottom for disposal thereof. In the use of such a structure, a gelatinous film forms upon the surface of the filter media and this film nurtures a relatively heavy growth of active biologic organisms which act upon the sewage as the latter passes through the filter bed in such a manner as to aid in the stabilizing of the organic solids in the sewage or other waste liquids being treated. The action of these organisms is both biological and mechanical, the mechanical function residing in the ability of the filter bed to separate out a part of the suspended matter and the biological function lying in the ability to separate out dissolved materials and to change the physical state of the dissolved and suspended materials so that they will rapidly settle out in a final settling operation.

In the use of a trickling filter of this character for biologic conversion of pre-clarified waste material, the mechanical efficiency of the filter becomes of minor consequence due to the absence of suspended matter in the waste, whereas the biological efficiency thereof becomes of paramount importance. The biological efficiency of a trickling filter is determined by the quantity of the biochemical oxygen demand (B. O. D.) satisfied or removed by the filter. For example, if ordinary pre-clarified waste as obtained by primary sedimentation of ordinary mixed waste encountered in beet sugar refining operations is fed directly to a trickling filter without dilution or other preparation and caused to pass therethrough and the resulting effluent discharged to a stream at an applied strength of substantially 50 parts per million (P. P. M.) of B. O. D., the capacity of the filter will be relatively low, amounting to about .25 to .5 lb. of B. O. D. per cubic yard of stone or other discrete filter bed material for a twenty-four-hour period. This low capacity of the ordinary filter arrangement as compared with the present filter arrangement of this invention is due to conditions which limit the ability of the filter to perform more efficiently. In other words, any effort to increase the feed to the filter will materially decrease the capacity thereof inasmuch as overloading of the filter will impair its biological functioning. The loading of a filter of this character must not exceed its ability to perform its biological function and otherwise the intended result is destroyed.

According to the present invention, however, the apparent capacity of the bio-filter unit may be materially increased by properly aging the initial effluent from the filter in an earthen detention pond or lagoon and recirculating a portion of the same through the filter unit as a diluent for fresh clarified waste introduced thereto. In this manner the B. O. D. concentration may be properly controlled and the capacity of the filter unit increased from the figures mentioned above to as high as 2.5 pounds of B. O. D. per cubic yard of stone for a twenty-four-hour period while producing an effluent of waste carrying a B. O. D. of approximately 50 P. P. M. after aging. At the same time, the use of an earth lagoon, which may conveniently be excavated from a region adjacent the filter bed, is extremely economical, and this factor, together with the increase of efficiency afforded to the trickling filter by the detention lagoon, renders the former practical for the purpose of treating industrial wastes whereas formerly the cost and low efficiency of the trickling filter has prohibited its use in this manner.

Accordingly, it is among the principal objects of the present invention to provide a novel form of detention body designed for use in connection with a trickling filter system by means of which the capacity, and hence the efficiency of the filter is materially increased.

Another object of the invention, in a recirculating trickling filter system, is to provide such a detention lagoon in which means is provided for controlling or retarding the flow of the filter bed discharge across the lagoon to obtain a more complete reaction between the oxygen demanding constituents of the liquid contained therein and the dissolved oxygen obtained by passage of the liquid through the filter bed. In carrying out this last-mentioned object, the invention contemplates the provision of an efficient baffle system whereby the discharge from the trickling filter is caused to become intimately mixed by an initial submergence thereof in the body of the liquid contained in the detention lagoon to prevent surface "short-circuiting" thereof across the lagoon before equilibration thereof has taken place. In this manner, any tendency of the filter discharge to pass directly to emittance as lagoon effluent by virtue of its elevated temperature and consequent low density as compared to the lower average temperature and higher density of the liquid in the detention lagoon will be avoided. This last-mentioned feature of the invention is especially significant in connection with the purification of wastes arising from the processing of sugar beets inasmuch as such wastes invariably have a temperature in excess of the wet bulb temperature of the atmosphere surrounding the refinery. Thus the thermal action of the detention lagoon is a cooling one and the overall temperature of the lagoon will constantly remain somewhat below the temperature of the filter discharge fed thereto.

A further object of the invention is to provide a continuous purification system of the character set forth above having means for withdrawing a portion of the effluent from the detention lagoon and intimately mixing the same with the feed of pre-clarified material to the trickling filter prior to delivering the latter to the filter bed. In connection with this last-mentioned object, it has been found that continuous operation of a filter is more conducive toward an aerobic condition of the filter than conventional intermittent operation. Thus it is preferable to maintain the filter in operation continuously even when the amount of incoming pre-clarified waste is small. Furthermore the aerating effect of allowing the solution to recirculate through the filter bed is materially increased and the depth of the filter bed may be correspondingly decreased.

Yet another object of the invention, in a detention lagoon or pond of the character described, is to provide a novel means for effecting withdrawal of the effluent from the cooler liquid regions of the pond to avoid withdrawal of any recently introduced warmer filter discharge which may have short-circuited across the pond prematurely.

The invention, in addition to being applicable to the treatment of pre-clarified wastes such as pre-clarified waste water arising in connection with the processing of sugar beets, may, with or without modification, be utilized in connection with unclarified wastes arising from operations of an intermittent or seasonal nature, as, for example, the commercial canning of vegetables, when such seasonal nature of the operation affords non-operating periods during which removal of the settled solids may be effected from the bottom of the detention lagoon.

Other objects and advantages of the invention, not at this time enumerated, will become apparent as the nature of the invention is better understood.

In the accompanying drawings there is disclosed one structural system involving a bio-filtration unit and a detention lagoon manufactured and assembled according to the principles of the present invention. It will be understood, however, that such a system is purely illustrative of one operative embodiment of the invention and that various other systems may be employed in practicing the invention.

In these drawings:

Figure 1 is a top plan view, somewhat diagrammatic in its representation, of a bio-filtration assembly constructed according to the principles of the present invention.

Figure 2 is a longitudinal sectional elevational view of the apparatus of Figure 1.

Figure 4 is a fragmentary perspective view, partly in section, of the lagoon illustrating one manner in which liquid is withdrawn therefrom for discharge and recirculation purposes.

Figure 5 is a sectional view taken substantially along the line 5—5 of Figure 4

Figure 6 is a fragmentary top plan view of the discharge end of the lagoon according to a modified form of the invention.

Figure 7 is a fragmentary sectional view similar to Figure 4 showing still another modified form of withdrawal apparatus, and Figure 8 is a sectional view taken substantially along the line 8—8 of Figure 7.

In all of the above-described views, like characters of reference are employed to designate like parts throughout.

Figure 3:
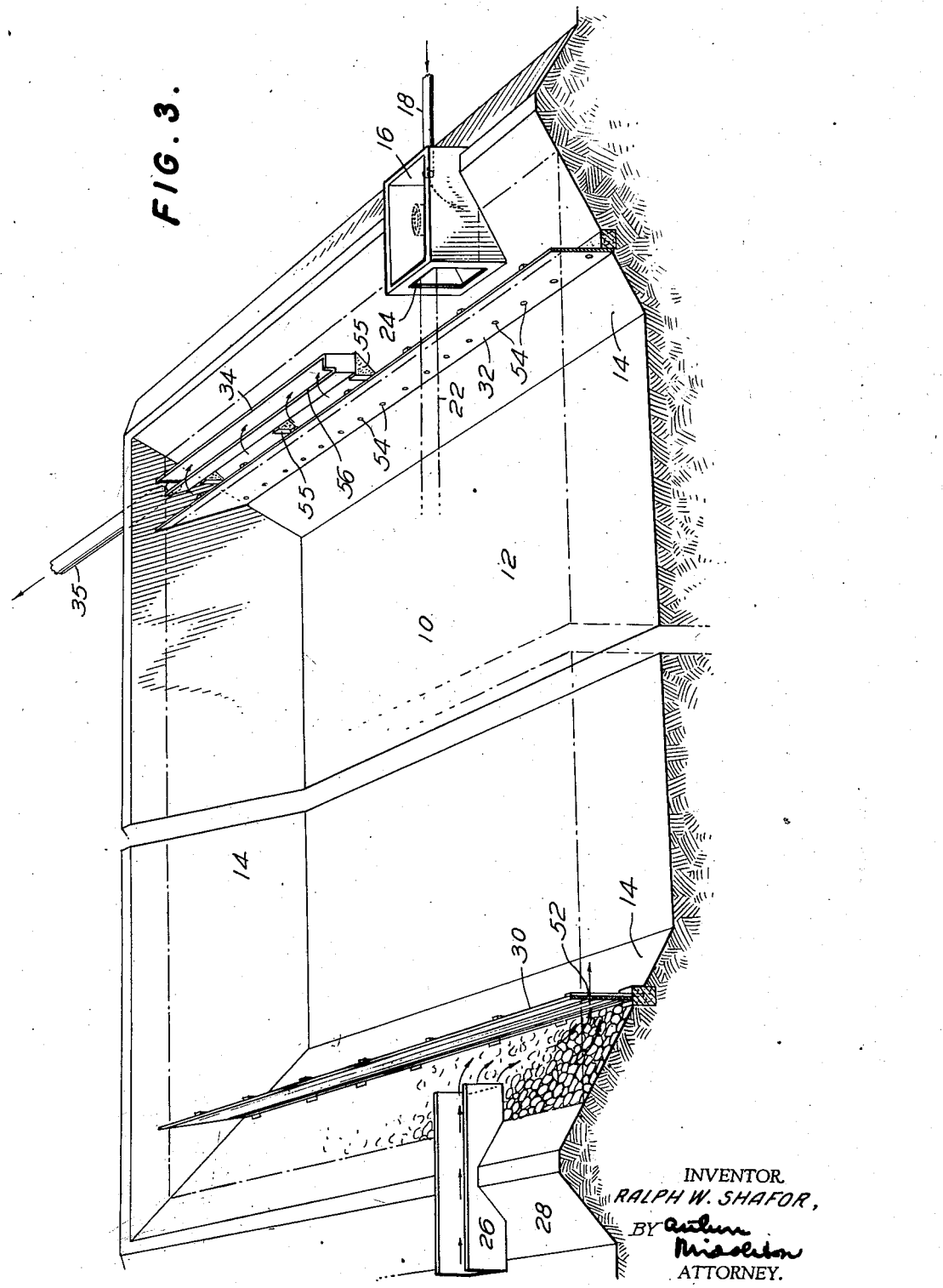
Figure 3 is a perspective view, partly in section, of an earth lagoon employed in connection with the invention.

The bio-filtration apparatus involves in its general organization a retention lagoon 10 for holding liquid undergoing treatment. The lagoon 10 may be formed of any suitable size or shape and in the present instance is shown as being generally of rectangular surface configuration although a circular or other shape may be conveniently utilized if desired. The floor 12 of the lagoon in the medial regions thereof is substantially flat while in the outer areas thereof, the floor slopes upwardly and outwardly as at 14.

The lagoon 10 is preferably excavated from a surface area adjacent the filter bed or porous medium hereinafter described and the purpose thereof is to retain effluent issuing from the porous medium in order that there may be a continuation of the reaction between the oxygen demanding constituents of the solution and the dissolved oxygen in the solution during its relatively slow passage through the lagoon. In other words, the function of the earthen lagoon is almost exclusively that of an equilibration reservoir. Inasmuch as the present bio-filtration assembly is designed for treatment of carefully pre-clarified waste material, little if any settling out of solids will occur in the lagoon 10. However, it is within the purview of the present invention to treat unclarified wastes and in such an instance any standard form of sludge removal apparatus may be employed when necessary in the lagoon to enable the bio-flocculated sludge and sloughings from the porous medium to be removed continually from the purification system.

Positioned at the discharge end of the lagoon 10 (i. e., the end remote from the porous medium) and preferably adjacent the longitudinal center line of the lagoon is a collecting well and sump 16, the side walls and bottom of which may be constructed of concrete or the like. A pipe line 18 communicates with the sump 16 for the purpose of introducing thereinto fresh waste or feed. A recirculating pump, diagrammatically illustrated at 20, is disposed in the sump 16 and serves to withdraw the liquid from the latter for recirculation through a line 22 to the porous medium as will appear presently. Ordinarily, the capacity of the pump 20 is such that it will withdraw from the sump 16 a volume of liquid several times as great as the amount of feed being introduced to the sump from the feed line 18, the balance of the liquid withdrawn being represented by an inflow of purified liquid through an opening 24 (see also Figure 3) in the front wall of the sump. A collecting flume 26 for conducting effluent from the porous medium to the lagoon 10 is mounted in a dividing wall 28 at the end of the lagoon adjacent the porous medium.

Baffles 30 and 32, the character and function of which will be set forth presently, are disposed in the lagoon and extend transversely thereacross while an overflow launder 34 is disposed in the lagoon between the baffle 32 and the end of the lagoon remote from the porous medium and communicates with a withdrawal pipe line 35 through which the treated effluent is carried from the system at a rate of withdrawal substantially equal to the rate of feed through the line 18.

Referring now to Figures 1 and 2, the conduit or line 22 leading from the pump 20 communicates with a vertical riser 36 and liquid withdrawn from the sump 16 passes upwardly through the riser 36 which extends centrally through the porous medium or filter bed 38 to a revolving distributor apparatus designated generally at 40 and including radially projecting pipes or conduits 42 and supporting braces 44 therefor. Each of the distributor pipes 42 is provided with a plurality of apertures or outlets 46 (Figure 2) by means of which liquid is evenly distributed over the upper surface of the filter bed upon rotation of the pipes about a central axis.

The filter bed 38 is formed of discrete material such as crushed rock and, in comparison to present-day filter beds employed in the conventional trickling filters in common use for treating unclarified waste materials, may be relatively shallow. The bed 38 is mounted in a tank 48 which is preferably circular and which is maintained at an elevation slightly higher than the level of liquid in the earth lagoon 10. The tank 48 is formed with an open bottom and is maintained elevated above a shallow drain basin 50 having a sloping bottom 51. Liquid passing through the filter bed 38 as filter discharge is collected in the basin 50 from whence it flows at a predetermined rate of discharge through the flume 26 into the earth lagoon 10. The filter bed 38 is thus, in effect, in closed circuit or cyclic sequence with the earth lagoon 10 whereby recycled liquid follows a flow path including the biologically active aerobic filtering bed 38 and the lagoon 10.

Because of the fact that the filter bed 38 is only slightly higher than the level of liquid in the earth lagoon 10, the static lift that must be effected by the pump 20 is small and accordingly an inexpensive large capacity pump may be employed as the chief prime mover for the system. Thus the total power requirements of operation per million gallons treated will be correspondingly low. The length of time consumed in the recirculation process is variable according to the character of the waste material but in any event is comparatively short, from one and one-half hours to three hours being ordinarily sufficient for complete treatment of the preclarified waste material.

Referring now to Figures 2 and 3, a plurality of ports 52 are formed in the baffle 30 adjacent but slightly elevated from the sloping wall 14 of the lagoon 10 and in this manner any spent bacterial growth discharged from the filter bed 38 will be confined to the region existing at the forward end of the lagoon, from whence it may be removed during non-operating periods. It is to be noted also that because the ports 52 are formed adjacent the bottom of the lagoon, short circuiting of the discharge issuing from the filter medium is reduced to a minimum. Ordinarily, industrial wastes, particularly waste encountered in the processing of sugar beets, are delivered at a temperature considerably above the wet bulb temperature of the atmosphere. Thus it may be expected that the feed to and the discharge from the filter medium 38 will be considerably warmer than the liquid contained in the lagoon which has been cooled to a certain extent during the detention period. Being warmer, and having a density lower than the main body of the liquid in the lagoon, the discharge issuing from the filter medium would ordinarily tend to float (so to speak) on the upper strata of the liquid and short circuit across the lagoon from the inlet or flume 26 directly to the overflow launder 34. By forming the ports 52 adjacent the bottom of the baffle 30, a cooler strata of the liquid is withdrawn from the detention region and at the same time the detention period or cycle is materially lengthened. Specifically, the size and number of the ports 52 is calculated according to various engineering exigencies in such a manner that the velocity of flow of the liquid through the ports will be substantially within the limits of from two to six feet per second. In this manner, since no mechanical agitating means is utilized in the lagoon, a jet effect is obtained in the lower stratas of the lagoon and intimate mixing of the liquid is made possible despite the lack of mechanical agitation. While a relatively high velocity of passage of the liquid through the ports 52 is obtained, the rate of flow of the liquid across the lagoon is on the whole comparatively slow and, depending upon the length of the lagoon, is such that the lagoon is traversed in from one and one-half to three hours as previously stated.

Still referring to Figures 1 and 2, a series of ports 54 are formed in the baffle 32 adjacent the bottom of the latter in order that a cooler strata of liquid may be withdrawn from the large detention region of the lagoon and conducted to the overflow launder 34, thus further enhancing the detention period and minimizing short circuiting. These latter ports 54 are likewise designed both in number and size so that a moderate jet effect and consequent agitation and intimate mixing is obtained by the passage of liquid therethrough.

While the drawings illustrate the ports 52 and 54 as being located adjacent the bottom of the respective baffles 30 and 32, the invention is not to be limited to such location thereof. Obviously in treating wastes which issue at a temperature below the wet bulb temperature of the atmosphere, the ports 52 and 54 would be located at a much higher region in the lagoon. Similarly, instead of introducing the discharge issuing from the filter medium or bed 38 into the lagoon 10 at the surface regions thereof, an underpass or sluice through the wall 28 would be provided to introduce the discharge in the lower regions of the lagoon.

Referring now to Figure 3, the overflow launder 34 is in the form of a trough which is mounted on supports 55 rearwardly of the baffle 32 and which is formed with a coextensive overflow or inflow lip or weir 56, the elevation of which determines the overall height or level of liquid in the lagoon. The launder communicates through one side wall of the lagoon with the withdrawal pipe 35 previously mentioned.

In Figures 4 and 5 a slightly modified form of overflow launder 34' is shown. In this form of the invention the trough-like launder is formed integrally with the baffle 32', thus affording economy of manufacture. The overflow or inflow lip or weir 56' is formed on the rear side of the launder and is coextensive therewith.

In Figure 6 another modified form of launder 34'' is shown. The launder 34'' is of trough-like configuration and extends completely across the lagoon, while the baffle 32 of the preceding forms of the invention has been omitted. A plurality of inlet ports 58'' are formed in the bottom of the launder and the depth of the launder is such that the effluent is withdrawn from the lagoon in the lower and colder regions thereof for reasons previously set forth in connection with other forms of the invention. The level of liquid in the launder and also in the lagoon is determined by means of an overflow weir 59'' over which the liquid flows in passing to the withdrawal pipe 35''.

In Figures 7 and 8, yet another form of launder 34''' is shown. This launder is mounted on supports 54''' carried by the sloping wall 14''' and communicates with the sump 16''' at both sides of the latter. Apertures or ports 58''' are formed in the bottom wall of the launder and effluent entering therethrough passes in part into the sump for recirculation purposes and in part overflows by means of a weir 59''' to the withdrawal pipe 35'''. The effluent is thus proportionately distributed for recirculation and for withdrawal in the approximate proportions set forth above in connection with the form of the invention shown in Figures 1 to 3, inclusive.

It is thought that from the foregoing description the operation and many advantages of the herein described bio-filtration system will be readily apparent. However, a specific example arising in connection with the processing of sugar beets is given as follows:

Clarified Steffen waste water arising in connection with such processing is ordinarily discarded from the processing operation at a temperature in excess of 167° F. and a B. O. D. of approximately 3,000 P. P. M. By feeding such clarified waste to the collecting sump 16 and mixing the same with from 8 to 20 parts of detention effluent arising from a previous operation, the B. O. D. of the mixture fed to the filter medium 38 will have a B. O. D. of approximately 150 to 250 P. P. M. The waste liquid after being treated in the filter bed 38 and after aging in the detention lagoon 10 will yield an innocuous waste product at the overflow launder 34 having a B. O. D. of about 25 to 50 P. P. M., thus representing a removal of B. O. D. equivalent to from 2 to 4 pounds of oxygen per cubic yard of stone in the filter bed with an average detention of from one and one-half to three hours in the detention lagoon.

In carrying out the present invention the apparatus may assume various physical forms of which those previously described are but illustrative. The invention relates particularly to an improved system for treating clarified waste liquids such as occurs in connection with sugar beet refinery methods and cannery waste liquids and the forms thereof illustrated herein are not intended to represent any specific plant design. The invention in the main has been described in connection with the purification of preclarified wastes, as, for example, waste water resulting from sugar beet refining or canning operations. The invention, however, is applicable to the purification of unclarified wastes and in such an instance any suitable conventional sludge removal apparatus may be installed in the earth lagoon, the purpose of which would be to enable the bio-flucculated sludge and sloughings from the filter bed or porous medium to be continually removed from the purification system. The invention therefore is not to be limited to the exact arrangement of parts shown or described herein and is to be limited only insofar as determined by the appended claims.

What is claimed is:

1. A continually operative closed-circuited liquid purification system consisting of an equilibration reservoir having an inlet and an outlet at opposite ends thereof for holding in substantial quiescence liquid material being treated and across which liquid is adapted to flow from the inlet end to the discharge end, a biological oxidizing bed of discrete material, discharge duct means for delivering liquid material issuing from the oxidizing bed to the equilibraton reservoir at the inlet end thereof, means for segregating liquid material from the reservoir at the discharge end thereof, means for introducing incoming polluted liquid to be purified into the segregated liquid material for combination therewith, means for conducting the combined segregated and introduced liquid to the oxidizing bed, and means associated with the outlet for withdrawing treated liquid from the equilibration reservoir.

2. A continually operative, closed-circuited, liquid purification system consisting of a biological oxidizing device and an earth lagoon prepared from a ground area in the vicinity of the oxidizing device, discharge duct means for delivering liquid material issuing from the oxidizing device to the lagoon at a section adjacent one side of the lagoon, means for segregating liquid material from the lagoon at a section adjacent the opposite side thereof and functionally remote from said first mentioned side, means for introducing incoming polluted liquid to be purified into said segregated liquid for combination therewith, means for conducting the combined segregated and introduced liquid to the oxidizing device, and means for withdrawing treated liquid from the lagoon.

3. A continually operative, closed-circuited, liquid purification system consisting of a biological oxidizing device and an earth lagoon prepared from a ground area in the vicinity of the oxidizing device and across which liquid is adapted to flow from an inlet end to a discharge end remote therefrom, means for retarding the flow of liquid across the lagoon, discharge duct means for delivering liquid material issuing from the oxidizing device to the lagoon at a region adjacent the inlet end thereof, means for segregating liquid material from the lagoon at a region adjacent the discharge end thereof, means for introducing incoming polluted liquid to be purified into said segregated liquid for combination therewith, means for conducting the combined segregated and introduced liquid to the oxidizing device, and means for withdrawing treated liquid from the lagoon.

4. A continually operative, closed-circuited liquid purification system consisting of a biological oxidizing device and an earth lagoon prepared from a ground area in the vicinity of the oxidizing device and across which liquid is adapted to flow from an inlet section to a discharge section remote therefrom, a baffle extending into the lagoon and projecting below the surface of liquid therein adjacent the inlet section thereof for preventing short-circuiting of liquid across the upper surface regions of the lagoon, discharge duct means for delivering liquid material issuing from the oxidizing device to the lagoon at a region adjacent the inlet section thereof, means for segregating liquid material from the lagoon at a region adjacent the discharge section thereof, means for introducing incoming polluted liquid to be purified into said segregated liquid for combination therewith, means for conducting the combined segregated and introduced liquid to the oxidizing device, and means for withdrawing treated liquid from the lagoon adjacent the upper regions thereof in the vicinity of the discharge end.

5. A continually operative closed-circuited liquid purification system consisting of a biological oxidizing bed of discrete material, a relatively shallow earthen equilibration lagoon prepared from a ground area in the vicinity of the oxidizing bed and extending outwardly therefrom and across which liquid is adapted to flow from an inlet end adjacent the bed to a discharge end remote therefrom, the body of liquid in the lagoon being contained substantially wholly below the level of the oxidizing bed, a baffle extending across the lagoon and projecting below the surface of liquid therein adjacent the inlet end thereof for preventing short-circuiting of liquid across the upper surface regions of the lagoon, discharge duct means for delivering liquid material issuing from the oxidizing bed by gravity to the surface regions of the lagoon at the inlet end thereof, means for segregating liquid material from the lagoon at the discharge end thereof, means for introducing incoming liquid to be purified into said segregated liquid for combination therewith, means for conducting the segregated liquid together with the introduced liquid to the oxidizing device, and means for withdrawing treated liquid from the lagoon.

6. A continually operative closed-circuited liquid purification system consisting of a biological oxidizing bed of discrete material, an earthen equilibration lagoon prepared from a ground area in the vicinity of the oxidizing bed and extending outwardly therefrom and across which liquid is adapted to flow from an inlet section adjacent the bed to a discharge section remote therefrom, the body of liquid in the lagoon being contained substantially wholly below the level of the oxidizing bed, a baffle extending across the lagoon and projecting below the surface of liquid therein and forming in conjunction with the walls thereof a sludge detention chamber at the inlet section of the lagoon, there being an opening in the baffle adjacent the bottom thereof and above the bottom of the lagoon, discharge duct means for delivering liquid material issuing from the oxidizing bed by gravity to the surface regions of the lagoon at the inlet section thereof, means for segregating liquid material from the lagoon at the discharge section and adjacent the upper regions thereof, means for introducing incoming polluted liquid to be purified into said segregated liquid for combination therewith, means for conducting the segregated liquid together with the introduced liquid to the oxidizing device, and means for withdrawing treated liquid from the lagoon.

RALPH W. SHAFOR.